US010691596B2

(12) United States Patent
Gupta et al.

(10) Patent No.: US 10,691,596 B2
(45) Date of Patent: Jun. 23, 2020

(54) INTEGRATION OF THE FREQUENCY OF USAGE OF TRACKS IN A TIERED STORAGE SYSTEM INTO A CACHE MANAGEMENT SYSTEM OF A STORAGE CONTROLLER

(71) Applicant: INTERNATIONAL BUSINESS MACHINES CORPORATION, Armonk, NY (US)

(72) Inventors: Lokesh M. Gupta, Tucson, AZ (US); Matthew G. Borlick, Tucson, AZ (US); Kyle A. Anderson, Sahuarita, AZ (US); Kevin J. Ash, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/964,904

(22) Filed: Apr. 27, 2018

(65) Prior Publication Data
US 2019/0332535 A1 Oct. 31, 2019

(51) Int. Cl.
*G06F 12/0811* (2016.01)
*G06F 12/123* (2016.01)

(52) U.S. Cl.
CPC ........ *G06F 12/0811* (2013.01); *G06F 12/123* (2013.01); *G06F 2212/1024* (2013.01); *G06F 2212/608* (2013.01)

(58) Field of Classification Search
CPC ...... G06F 3/0685; G06F 3/061; G06F 3/0647; G06F 3/0653; G06F 12/122; G06F 16/2272; G06F 3/068; G06F 12/0811; G06F 12/123; G06F 2212/1024; G06F 2212/608; G06F 3/0649

USPC ......................................................... 711/101
See application file for complete search history.

(56) References Cited

U.S. PATENT DOCUMENTS

| 9,043,327 | B1* | 5/2015 | Dunagan et al. ........................... G06F 17/30371 |
| 9,645,944 | B2* | 5/2017 | Hyde, II et al. ...... G06F 12/122 12/122 |
| 2013/0111146 | A1 | 5/2013 | Ash et al. |
| 2013/0185493 | A1* | 7/2013 | Benhase et al. ........ G06F 12/06 711/105 |
| 2016/0041903 | A1 | 2/2016 | Maheshwari |
| 2016/0371186 | A1 | 12/2016 | Shetty et al. |
| 2017/0060764 | A1 | 3/2017 | Shetty et al. |
| 2018/0150485 | A1* | 5/2018 | Tripathy ............. G06F 16/1748 |
| 2019/0013062 | A1* | 1/2019 | Atallah et al. .... G11C 11/40607 |
| 2019/0026206 | A1* | 1/2019 | Harutyunyan et al. ...................... G06F 11/3006 |

FOREIGN PATENT DOCUMENTS

CN 106897030 6/2017

OTHER PUBLICATIONS

English translation of CN106897030 dated Jun. 27, 2017.

* cited by examiner

*Primary Examiner* — Hashem Farrokh
(74) *Attorney, Agent, or Firm* — Rabindranath Dutta; Konrad Raynes Davda & Victor LLP

(57) ABSTRACT

A storage tier management application indicates a heat index for each extent of a plurality of extents, wherein a higher heat index indicates a greater frequency of usage of tracks of an extent than a lower heat index. A least recently used (LRU) list for cache management is configured to perform demotion of tracks of a lower heat index prior to demotion of tracks of a higher heat index.

18 Claims, 12 Drawing Sheets

INTEGRATION OF THE FREQUENCY OF USAGE OF TRACKS IN A TIERED STORAGE SYSTEM INTO A CACHE MANAGEMENT SYSTEM OF A STORAGE CONTROLLER

BACKGROUND

1. Field

Embodiments relate to the integration of the frequency of usage of tracks in a tiered storage system into a cache management system of a storage controller.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual server based storage controller, in the event of a failure of one of the two servers, the other server that has not failed may take over the operations performed by the failed server.

Data written from a host may be stored in the cache of the storage controller, and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device. In computing, cache replacement policies are used to determine which items to discard (i.e., demote) from the cache to make room for new items in the cache. In a least recently used (LRU) cache replacement policy, the least recently used items are discarded first.

Certain storage controllers may control many different types of storage devices with different storage capacities and response times. For example a storage controller may control solid state drives (SSD) and hard disk drives (HDD), where SSDs have a lower storage capacity but a faster response time than HDDs. A storage tier management mechanism may determine which data is being used most often (this data is also referred to as hot data), and place the data on SSD. Infrequently used data, or cold data, is placed on HDD. This is advantageous as HDDs have greater capacity than SSDs, whereas SSDs have a faster response time than HDDs. The storage tier management mechanisms may move frequently accessed data from HDDs to SSDs, thus placing such data in a faster tier of storage.

SUMMARY OF THE PREFERRED EMBODIMENTS

Provided are a method, system, and computer program product in which a storage tier management application indicates a heat index for each extent of a plurality of extents, wherein a higher heat index indicates a greater frequency of usage of tracks of an extent than a lower heat index. A least recently used (LRU) list for cache management is configured to perform demotion of tracks of a lower heat index prior to demotion of tracks of a higher heat index.

In certain embodiments, entries in the LRU list are determined based on usage statistics for tracks collected over a first interval of time. The heat index is determined based on usage statistics of tracks of extents collected over a second interval of time that is at least a 100 times greater than the first interval of time.

In additional embodiments, the configuring of the LRU list comprises: partitioning the LRU list into a plurality of partitions, wherein each partition represents a heat index range; and demoting, from a cache, a track indicated in a partition that indicates tracks of a lower heat index, prior to demoting, from the cache, a track indicated in a partition that indicates tracks of a higher heat index.

In further embodiments, the storage tier management application periodically moves extents of a lower heat index to a storage device having a higher response time and moves extents of higher heat index to a storage device having a lower response time.

In yet further embodiments, the heat index is an indication of a frequency of usage of tracks of an extent as determined by the storage tier management application.

In certain embodiments, tracks are placed in the LRU list by measuring usage of tracks in a first time period, wherein the heat index is calculated based on the frequency of usage of the tracks of the extent over a second time period that is greater than the first time period.

In further embodiments, the first time period is at most 10 minutes, and wherein the second time period is at least 1 hour.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A cache replacement policy in a storage controller may be LRU based. In a LRU based mechanism, a track upon being accessed is added to a most recently used (MRU) end of a LRU list. As the track ages (i.e., is not used) the track moves to the LRU end of the LRU list and then gets demoted (i.e., discarded or removed) from the cache.

A storage tier management application in a storage controller manages tiered storage and may determine the frequency of usage (i.e., access for reading or writing) of extents over an extended period of time, such as 24 hours. An extent is comprised of a plurality of tracks, and more frequently used extents may be moved to storage devices with faster access time and less frequently used extents may be moved to storage devices with slower access time. Tracks of the more frequently used extents may be referred to as hot tracks and the tracks of the less frequently used extents may be referred to as cold tracks.

The life cycle of a track in the cache typically ranges from a few seconds to few minutes, where the life cycle refers to the amount of time the track stays in the cache. In certain storage controllers, the cache management application may not have information on whether a track in the cache is cold or hot and may use a purely LRU cache replacement policy.

However, there are times when cold tracks gets staged into cache and the cold tracks may replace hot tracks. During this time, the cache hit ratio may go down, where the cache hit ratio is the ratio of the number of cache hits to the number of lookups of tracks in the cache, usually expressed as a percentage.

Certain embodiments, provide improvements to computer technology, by integrating the frequency of usage of tracks in a tiered storage system into a cache management system of a storage controller. A LRU list is augmented with the information on whether a track is hot or cold, and hot tracks are not demoted from cache when cold tracks are present for demotion from the cache. As a result, the cache hit ratio is improved to improve the processing speed of a storage controller.

EXEMPLARY EMBODIMENTS

Figure 1:
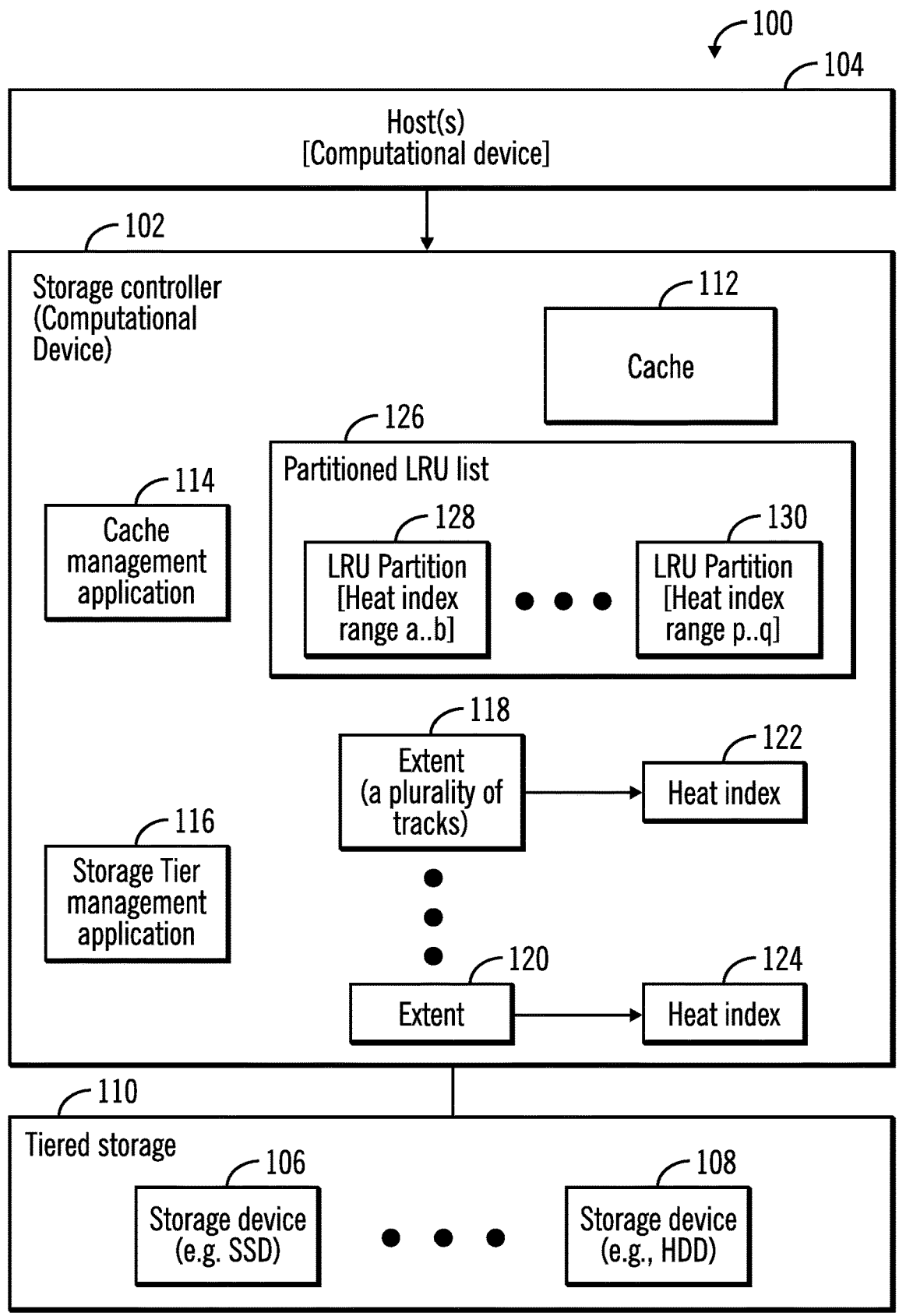
FIG. 1 illustrates a block diagram of a computing environment comprising a storage controller coupled to one or more hosts and one or more storage devices that are configured as a tiered storage, in accordance with certain embodiments.

FIG. 1 illustrates a block diagram of a computing environment 100 comprising a storage controller 102 coupled to one or more hosts 104 and one or more storage devices 106, 108 that are configured as a tiered storage 110, in accordance with certain embodiments.

The storage controller 102 allows the one or more hosts 104 to perform input/output (I/O) operations with logical storage maintained by the storage controller 102. The physical storage corresponding to the logical storage may be found in one or more of the storage devices 106, 108 and/or a cache 112 of the storage controller 102.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed. Each of the plurality of servers may be referred to as a processing complex and may include one or more processors and/or processor cores.

The storage controller 102 and the one or more hosts 104 may be elements in any suitable network, such as, a storage area network, a wide area network, the Internet, an intranet. In certain embodiments, storage controller 102 and the one or more hosts 104 may be elements in a cloud computing environment.

The cache 112 may be any suitable cache known in the art or developed in the future. In some embodiments, the cache 112 may be implemented with a volatile memory and/or non-volatile memory. The cache 112 may store both modified and unmodified data, where a cache management application 114 may periodically destage (i.e., move) data from the cache 112 to storage devices 106, 108 controlled by the storage controller 102. In certain embodiments, cache management application 114 may be implemented in software, firmware, hardware or any combination thereof.

The tiered storage 110 may be comprised of a plurality of storage devices 106, 108. For example, in certain embodiments the storage device 106 may be a solid state drive (SSD) and the storage device 108 may be a hard disk drive (HDD). The SSD 106 may be referred to as a higher tier of storage and the HDD 108 may be referred to as a lower tier of storage. A storage tier management application 116 that executes in the storage controller collects usage statistics on the plurality of extents 118, 120 that are used to store the data in the storage devices 106, 108. Each extent 118, 120 is comprised of a plurality of tracks. The storage tier management application 116 associates a heat index 122, 124 with the extents 118, 120, where a heat index is indicative of a frequency of access of the track over a period of time (e.g., 24 hours). A high value of a heat index for an extent means that extent is hot (i.e., frequently accessed), and low value of a heat index for an extent means that extent is cold (i.e., infrequently accessed). The heat index denotes the degree of hotness or coldness. In certain embodiments, the storage tier management application 116 may be implemented in software, firmware, hardware or any combination thereof.

A partitioned least recently used (LRU) list 126 is maintained in the storage controller 102 by the cache management application 114. An LRU partition 128 may include tracks that have heat indexes between a and b, and an LRU partition 130 may include tracks that have heat indexes between p and q. For example, the LRU partition 128 may include cold tracks with heat indexes that range from 0 to 10, and the LRU partition 130 may indicate hot tracks with heat indexes that range from 10 to 20.

In certain embodiments, the cache management application 114 demotes tracks from the LRU partition that has the coldest tracks available. While demoting tracks from a LRU partition, the LRU tracks are demoted first. Therefore, the usage statistics collected by the storage tier management application 116 are integrated into the cache management application 114, to improve the cache hit ratio by using the partitioned LRU list 126.

Figure 2:
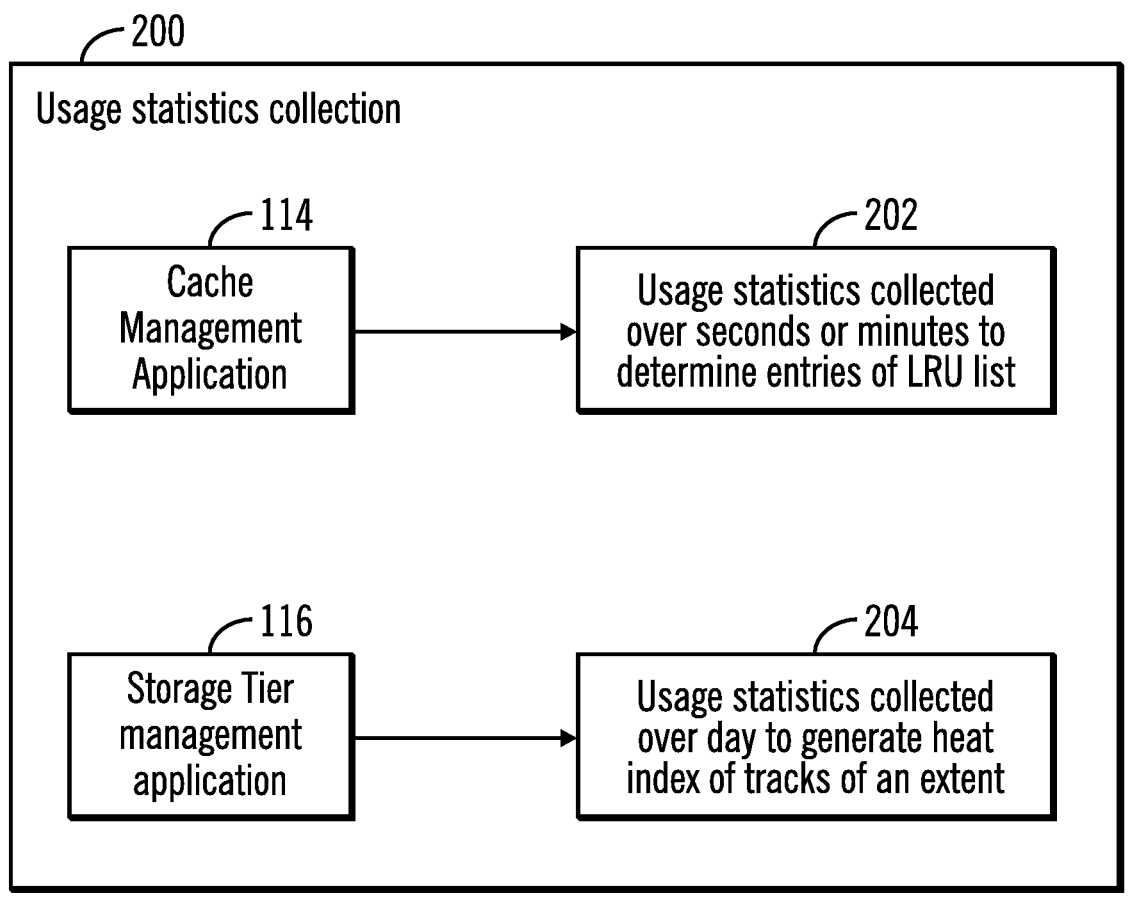
FIG. 2 illustrates a block diagram that shows usage statistics collection for tracks by a cache management application and a storage tier management application, in accordance with certain embodiments.

FIG. 2 illustrates a block diagram 200 that shows usage statistics collection for tracks by a cache management application 114 and a storage tier management application 116, in accordance with certain embodiments. The cache management application collects usage statistics over seconds or a few minutes (e.g., less than 10 minutes) to determine the entries of the LRU list 126 (as shown via reference numeral 202). The storage tier management application determines usage statistics collected over an extended period of time (e.g. 24 hours) to generate the heat index of tracks of an extents (as shown via reference numeral 204). The time duration on the basis of which heat index is calculated may be 100 times more than the time duration on the basis of which the cache management application collects usage statistics of tracks in the cache.

Figure 3:
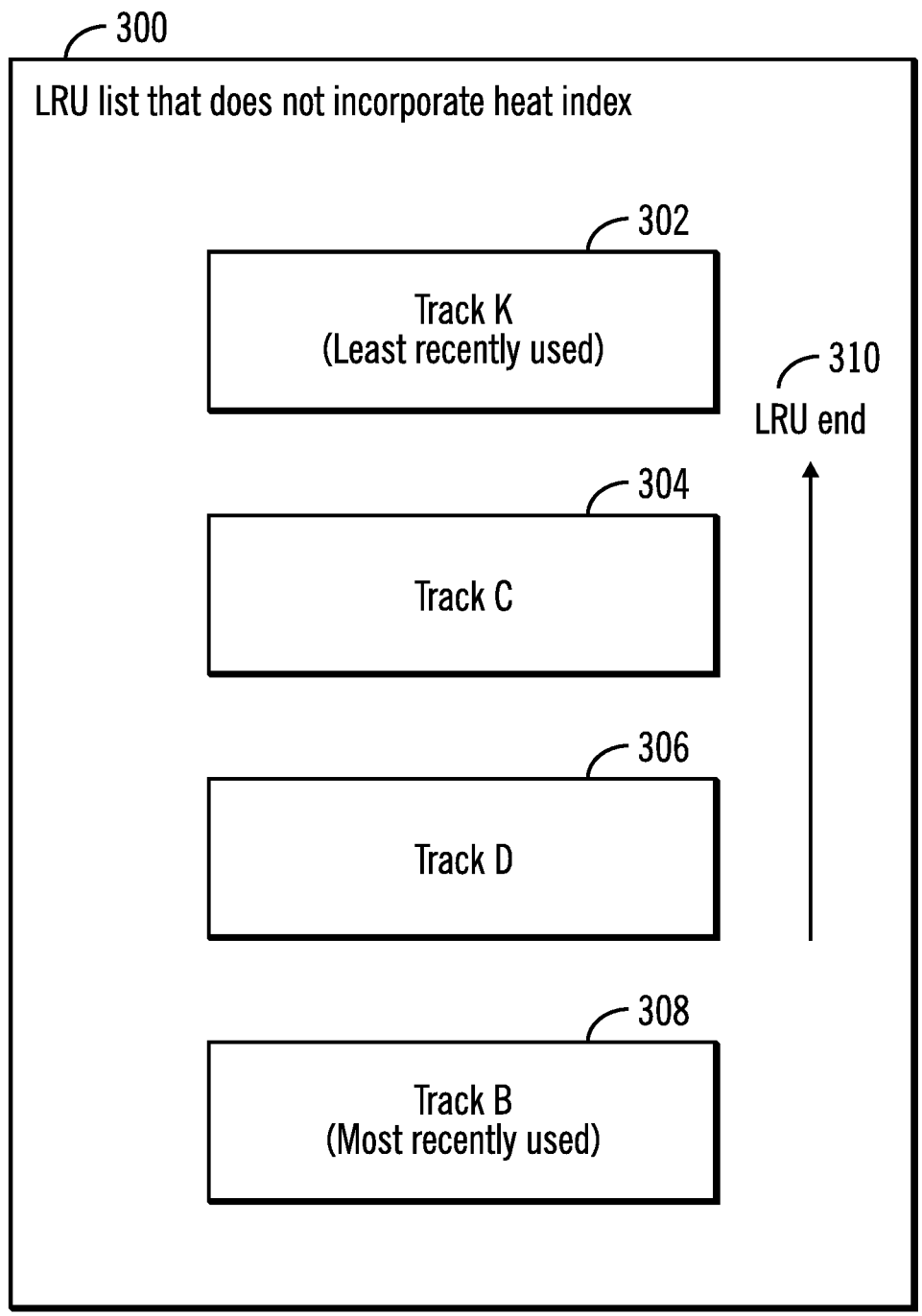
FIG. 3 illustrates a block diagram that shows a least recently used (LRU) list that does not incorporate information on frequency of usage of tracks determined by a storage tier management application, in accordance with certain embodiments.

FIG. 3 illustrates a block diagram 300 that shows a least recently used (LRU) list that does not incorporate information on frequency of usage of tracks determined by a storage tier management application, in accordance with certain embodiments.

For simplicity, only four tracks, denoted as track K 302, track C 304, track D 306, and track B 308 are shown in FIG. 3, although a typical LRU list may have thousands or tens of thousands of tracks.

The LRU end of the list is towards the top (as shown via reference numeral 310). As a result, track K 302 is the least recently used track, and track B 308 is the most recently used track.

Unless heat index information was included with the tracks, even if track K 302 is hot and tracks C, D, B 304, 306, 308 are cold, track K would be demoted in a LRU cache replacement policy. However hot track K 302 is likely to seek entry to the cache shortly after demotion, and the cache hit ratio would be decreased.

Figure 4:
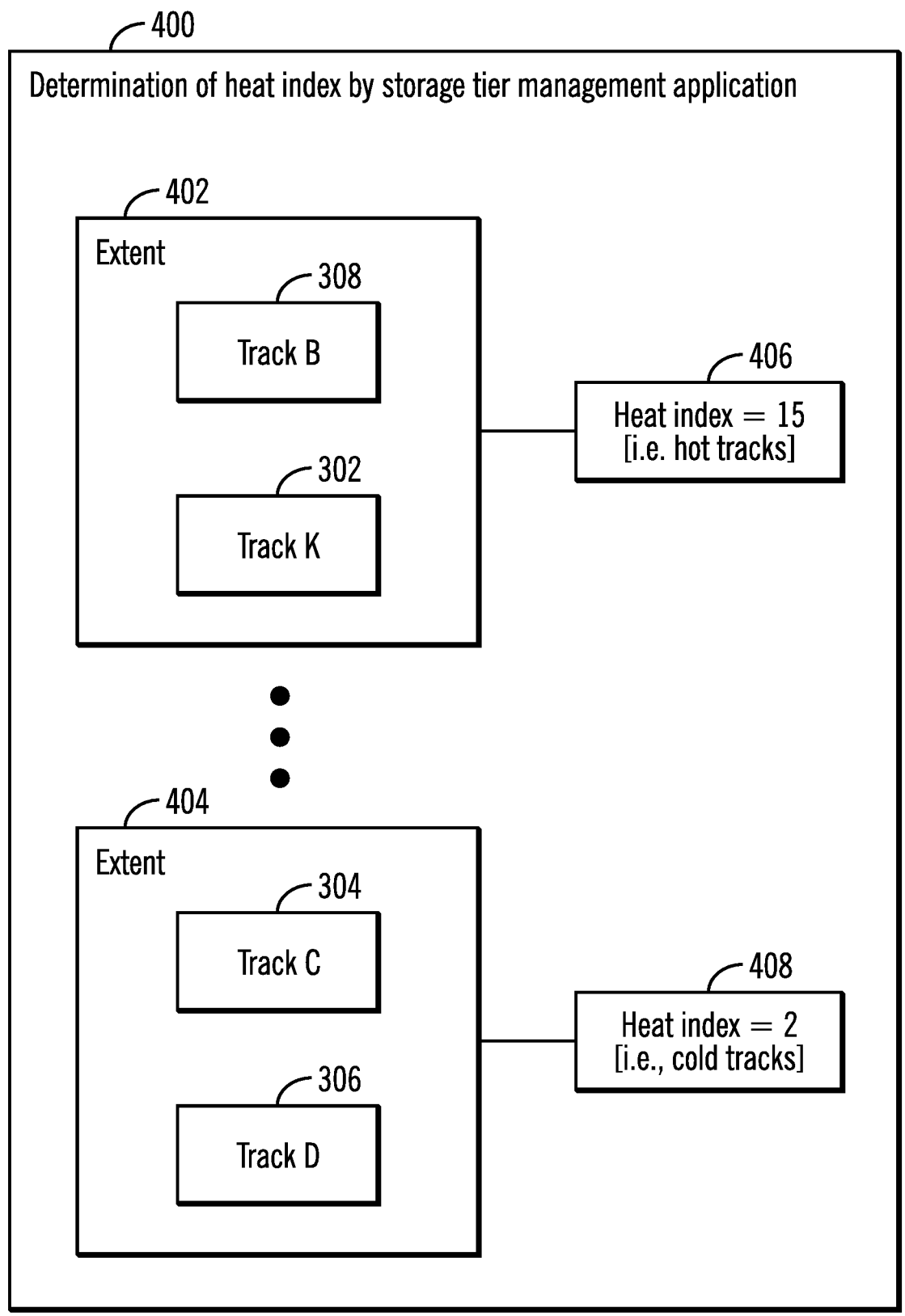
FIG. 4 illustrates a block diagram that shows the determination of heat index of tracks by a storage tier management application, in accordance with certain embodiments.

FIG. 4 illustrates a block diagram 400 that shows the determination of heat index of tracks by a storage tier management application 116, in accordance with certain embodiments.

The storage tier management application determines that extent 402 which has track B 308 and track K 302 has a heat index of 15 (shown via reference numeral 406), whereas extent 404 which has track C 304 and track D 306 has a heat index of 2 (shown via reference numeral 408). Thus, tracks B 308 and K 302 are hot tracks, and tracks C 304 and D 306 are cold tracks.

It should be noted that while FIG. 4 shows two extents with each extent having two tracks, the storage controller 102 may manage tens of thousands or more extents and each extent may have hundreds or thousands or more of tracks.

Figure 5:
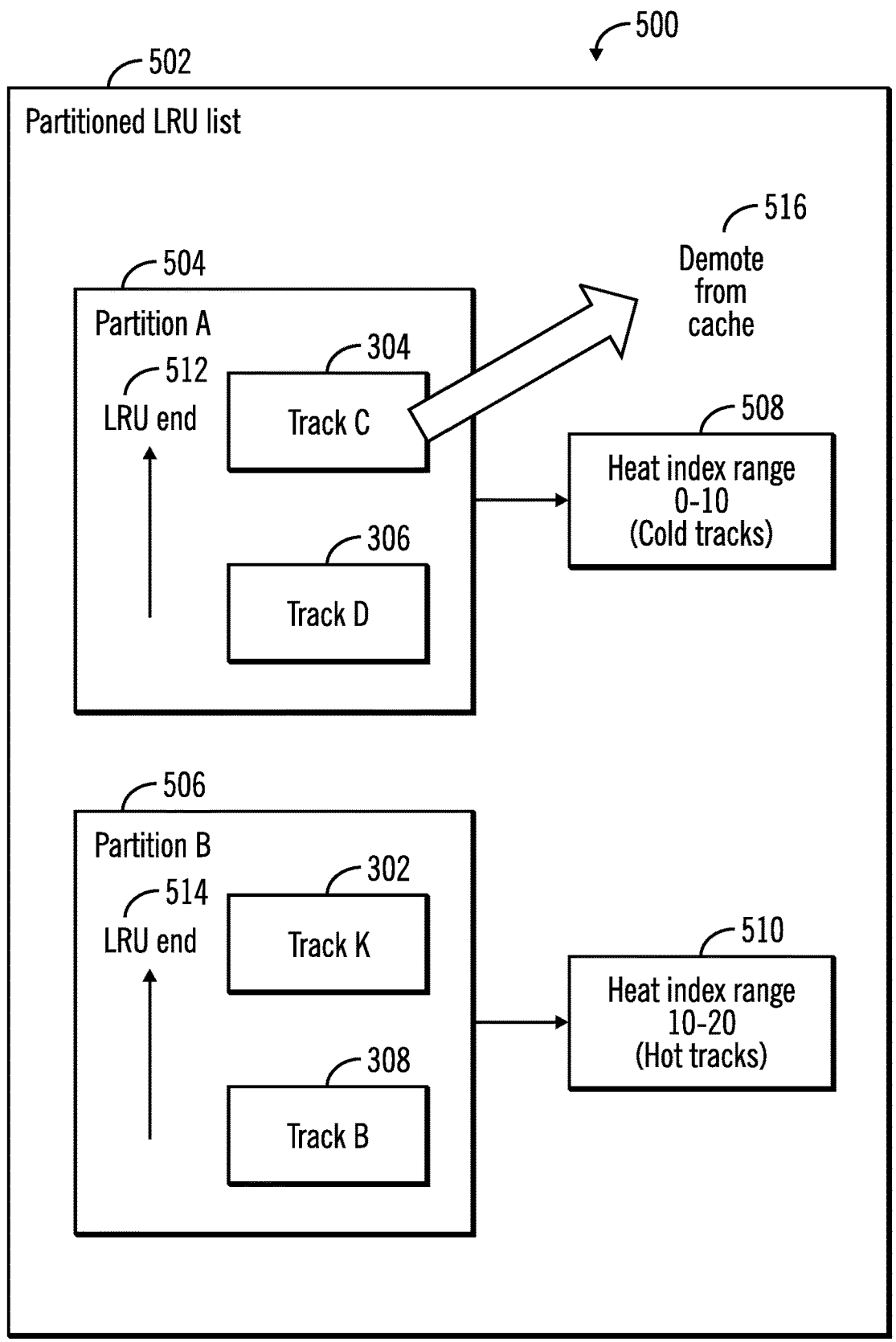
FIG. 5 illustrates a block diagram that shows a partitioned LRU list that incorporates the heat index of tracks, in accordance with certain embodiments.

FIG. 5 illustrates a block diagram 500 that shows a partitioned LRU list 502 that incorporates the heat index of tracks, in accordance with certain embodiments.

The partitioned LRU list 502 includes partition A 504 that has tracks with heat index range between 0 and 10 (i.e., cold tracks) [shown via reference numeral 508], and partition B 506 has tracks with heat index range between 10-20 (i.e., hot tracks) [shown via reference numeral 510]. In view of track C 304 and track D 306 designated as tracks with heat index 2 (in FIG. 4), track C 304 and track D 306 are placed in partition A 504 which encompasses the heat index range of 0-10. In view of track K 302 and track B 308 designated as tracks with heat index 15 (in FIG. 4), track K 302 and track B 308 are placed in partition B 506 which encompasses the heat index range of 10-20.

Within each partition the least recently used track is placed towards the LRU end 512, 514. For example, since in FIG. 3, track C 304 was used less recently than track D 306, in partition A 504 the LRU end shows track C 304.

In response to a need for a track to be demoted from the cache 112, track C 304 is demoted from the cache 112 (as shown via reference numeral 516), as the cache management application 114 demotes tracks from partition A 504 with the least recently used track being demoted first, before demoting any track from partition B 506.

The cache management application thus removes tracks from the partition with the cold tracks (i.e., partition A 504), before removing tracks from the partition with the hot tracks (partition B 506). As a result, the cache hit ratio is increased while removing least recently used tracks within a partition of the partitioned LRU list 502.

Figure 6:
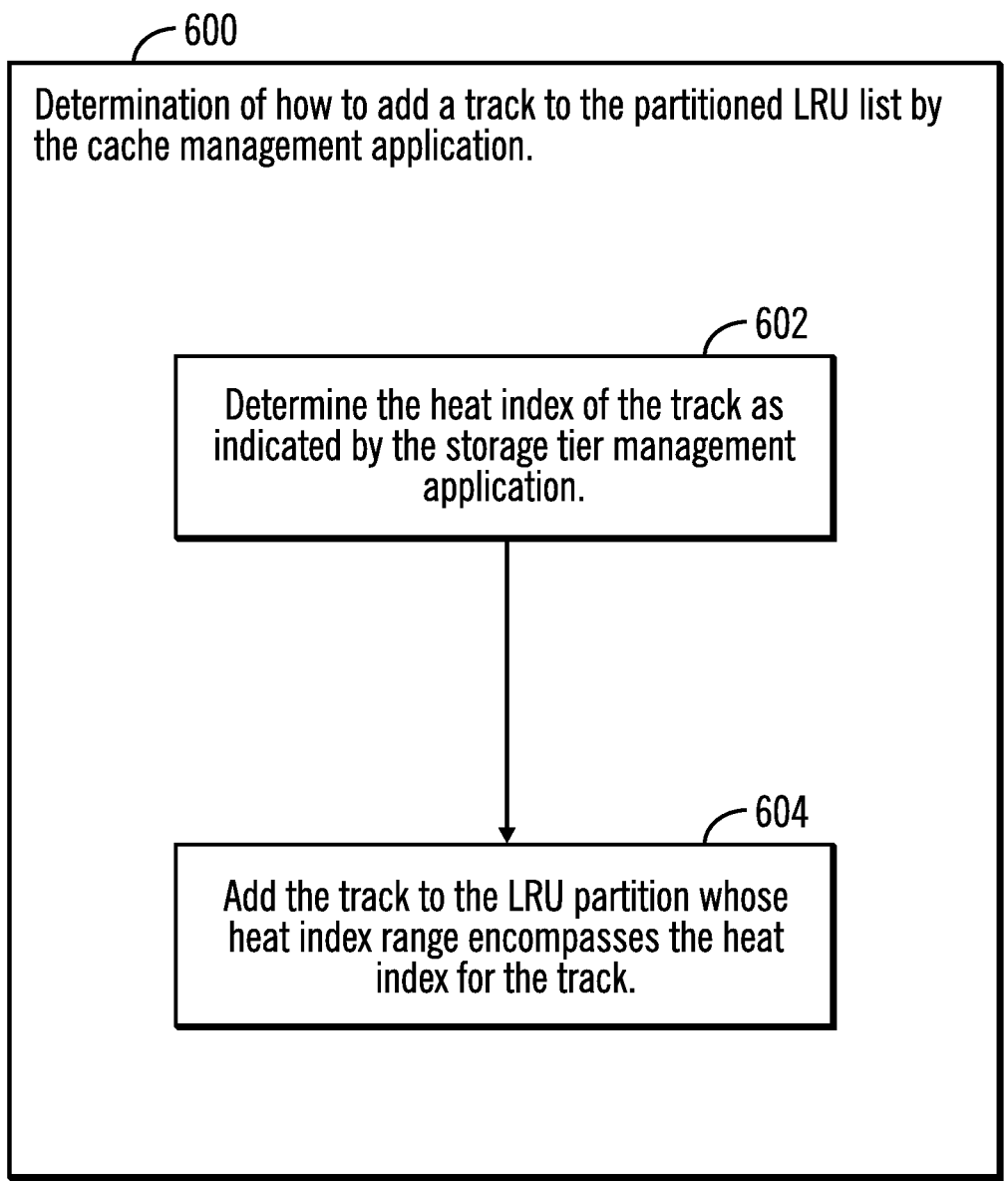
FIG. 6 illustrates a flowchart that shows the addition of a track to the partitioned LRU list by the cache management application, in accordance with certain embodiments.

FIG. 6 illustrates a flowchart 600 that shows the addition of a track to the partitioned LRU list 126 by the cache management application 114 that executes in the storage controller, in accordance with certain embodiments. The operations shown in FIG. 6 improves the performance of the storage controller 102.

Control starts at block 602 in which the cache management application 114 determines the heat index of the track as indicated by the storage tier management application 116. Control proceeds to block 604 in which the cache management application 114 adds the track to the LRU partition whose heat index range encompasses the heat index for the track.

Therefore, FIG. 6 shows operations for adding tracks to the partitioned LRU list 126 based on the heat index of tracks.

Figure 7:
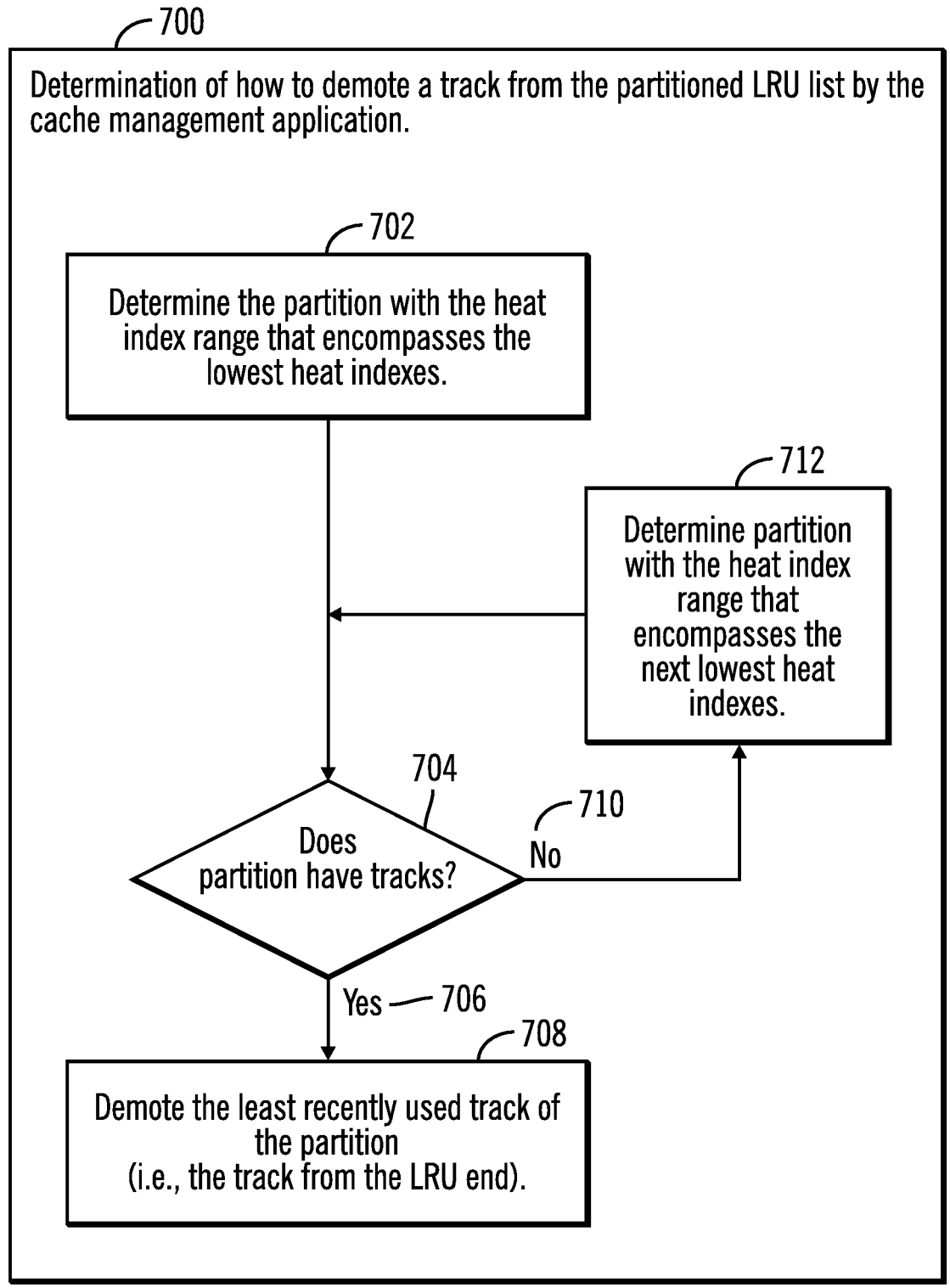
FIG. 7 illustrates a flowchart that shows the demotion of a track from the partitioned LRU list by the cache management application, in accordance with certain embodiments.

FIG. 7 illustrates a flowchart 700 that shows the demotion of a track from the partitioned LRU list 126 by the cache management application 114 that executes in the storage controller 102, in accordance with certain embodiments. The operations shown in FIG. 7 improves the performance of the storage controller 102.

Control starts at block 702 which the cache management application 114 determines the partition with the heat index range that encompasses the lowest heat indexes (e.g., partition A 504 in FIG. 5). A determination is made as to whether the determined partition has any tracks (at block 704). If so ("Yes' branch 706), the cache management application 114 demotes the least recently used track of the partition which is the track from the LRU end (as shown via reference numeral 708).

If a determination is made that the determined partition does not have any tracks ("No" branch 710) then control proceeds to block 712 in which the cache management application 114 determines the partition with the heat index range that encompasses the next lowest heat indexes, and control returns to block 704.

As a result of the operations of FIG. 7, tracks are demoted from partitions that have colder tracks first. Within a partition of the partitioned LRU list 126, least recently used tracks are demoted first.

Figure 8:
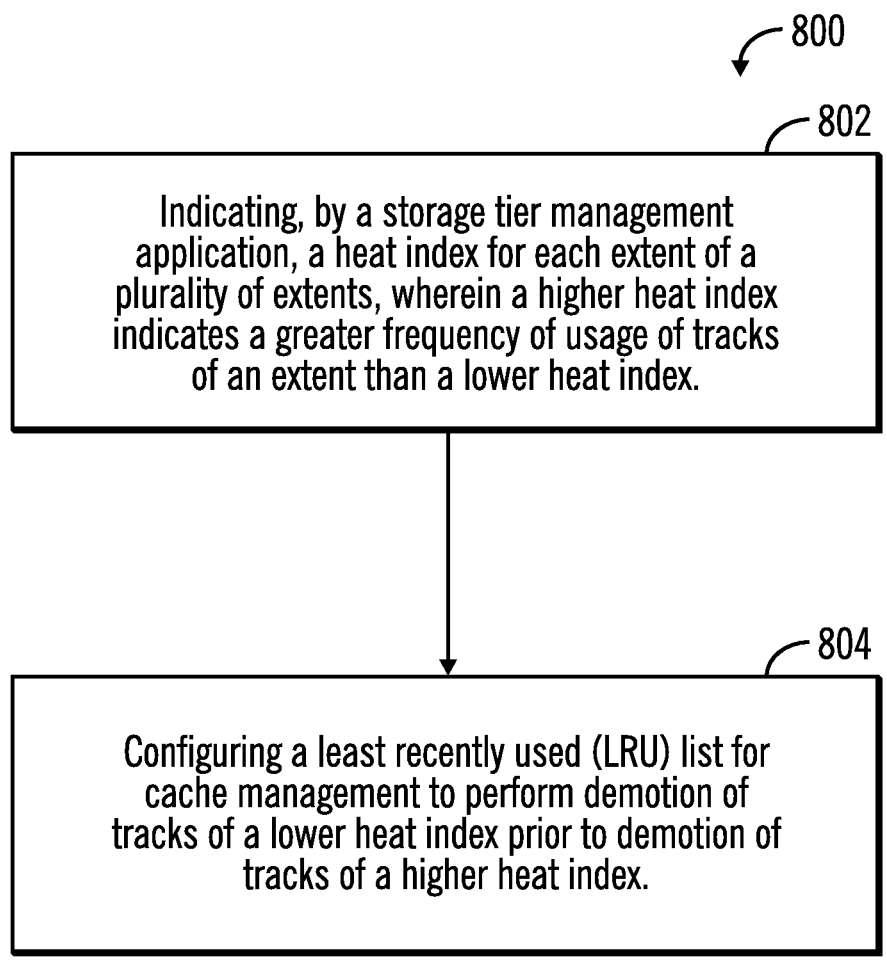
FIG. 8 illustrates a flowchart that shows the integration of the frequency of usage of tracks in a tiered storage system into a cache management system of a storage controller, in accordance with certain embodiments.

FIG. 8 illustrates a flowchart that shows the integration of the frequency of usage of tracks in a tiered storage system into a cache management system of a storage controller, in accordance with certain embodiments. The operations shown in FIG. 8 improves the performance of the storage controller 102.

Control starts at block 802 in which storage tier management application 116 indicates a heat index 122, 124 for each extent of a plurality of extents 118, 120, wherein a higher heat index indicates a greater frequency of usage of tracks of an extent than a lower heat index. Usage of tracks means access of tracks for reading or writing for the purposes of this disclosure. A least recently used (LRU) list 126 for cache management is configured (at block 804) to perform demotion of tracks of a lower heat index prior to demotion of tracks of a higher heat index.

Figure 9:
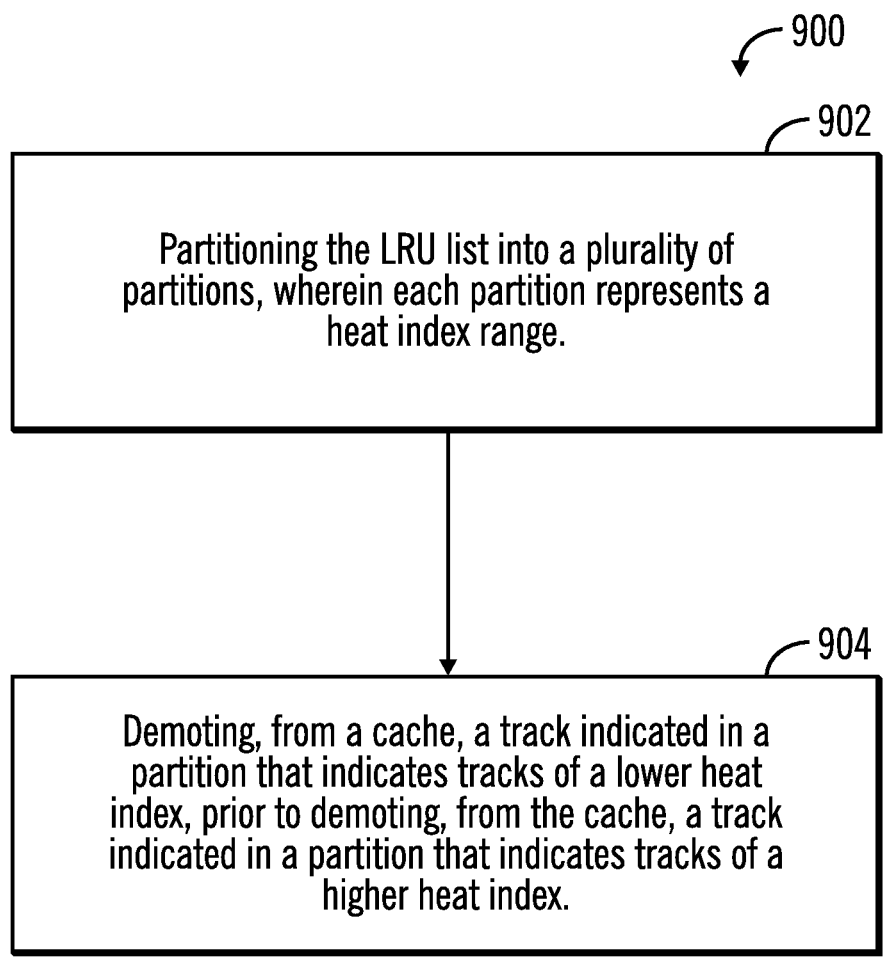
FIG. 9 illustrates a flowchart that shows how a LRU list is configured to generate the partitioned LRU list, in accordance with certain embodiments.

FIG. 9 illustrates a flowchart 900 that shows how a LRU list is configured to generate the partitioned LRU list, in accordance with certain embodiments. The operations shown in FIG. 9 improves the performance of the storage controller 102.

Control starts at block 902 in which the cache management application 114 partitions the LRU list 126 into a plurality of partitions 128, 130, wherein each partition represents a heat index range. Control proceeds to block 904 in which the cache management application 114 demotes from the cache 112, a track indicated in a partition that indicates tracks of a lower heat index, prior to demoting, from the cache 112, a track indicated in a partition that indicates tracks of a higher heat index.

Therefore, FIGS. 1-9 illustrate certain embodiments in which information on the usage of tracks provided by a storage tier management applications generated over an extended time period (e.g., a day) is incorporated into the LRU list 126 for demoting tracks from the cache. As a result, tracks that are hot (i.e., more likely to be used in accordance with indications provided by the storage tier management application 116) are maintained in the cache while tracks that are cold (i.e., less likely to be used in accordance with indications provided by the storage tier management application 116) are demoted based on a partitioning of the LRU list. The hit ratio of the cache 112 is improved.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 10:
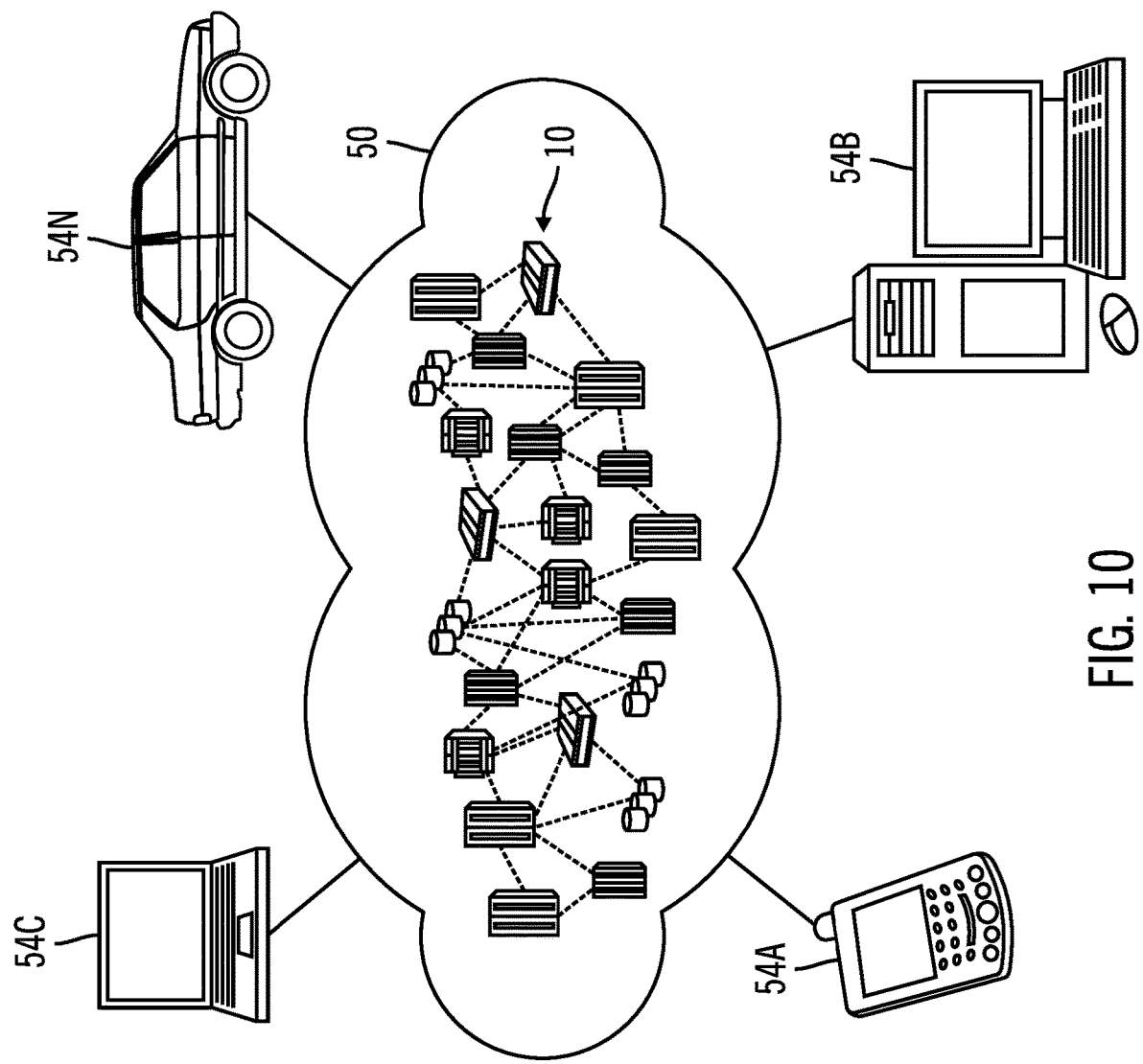
FIG. 10 illustrates a block diagram of a cloud computing environment, in accordance with certain embodiments.

Referring now to FIG. 10 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
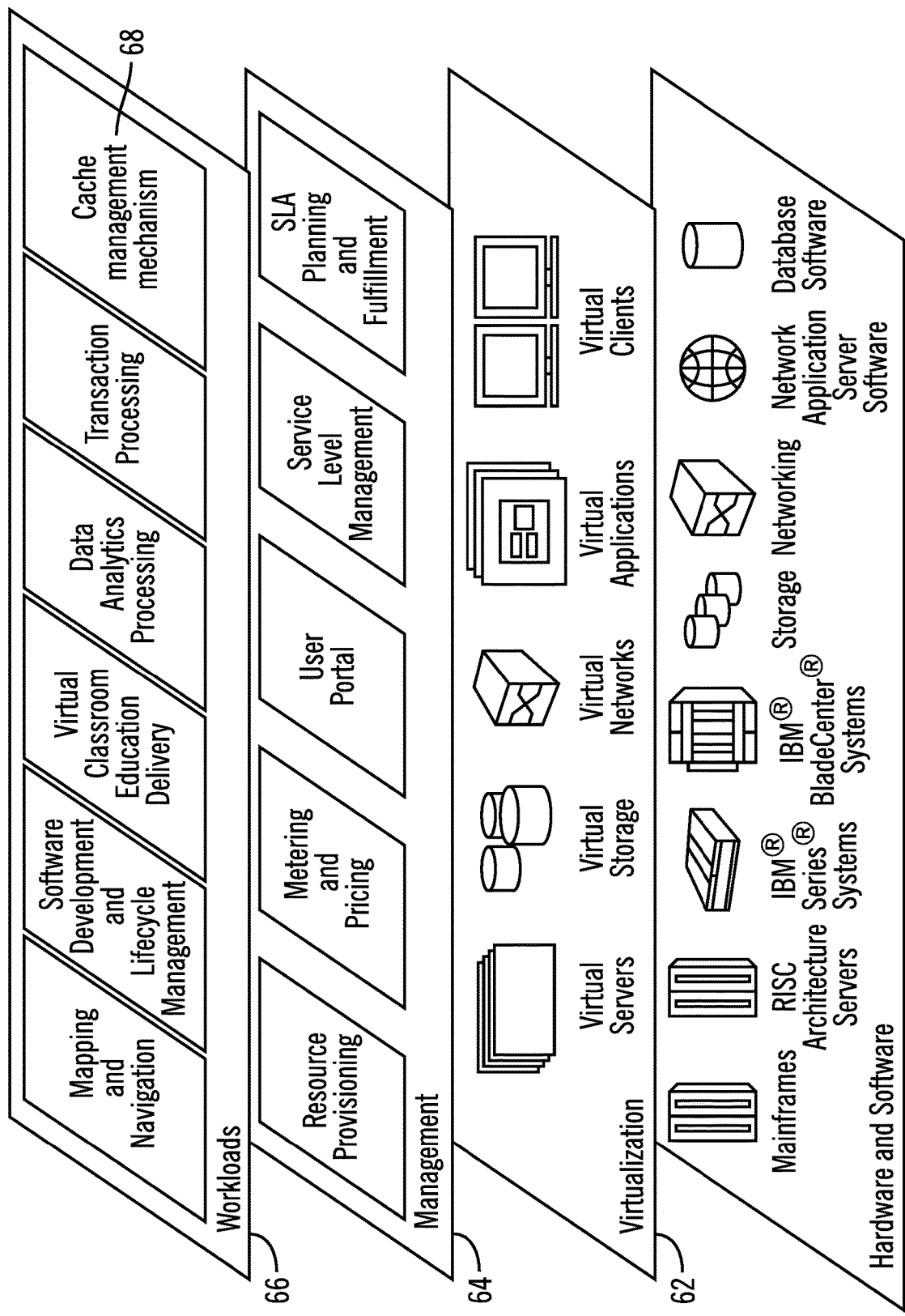
FIG. 11 illustrates a block diagram of further details of the cloud computing environment of FIG. 10, in accordance with certain embodiments.

Referring now to FIG. 11, a set of functional abstraction layers provided by cloud computing environment 50 (FIG. 10) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cache management mechanism 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
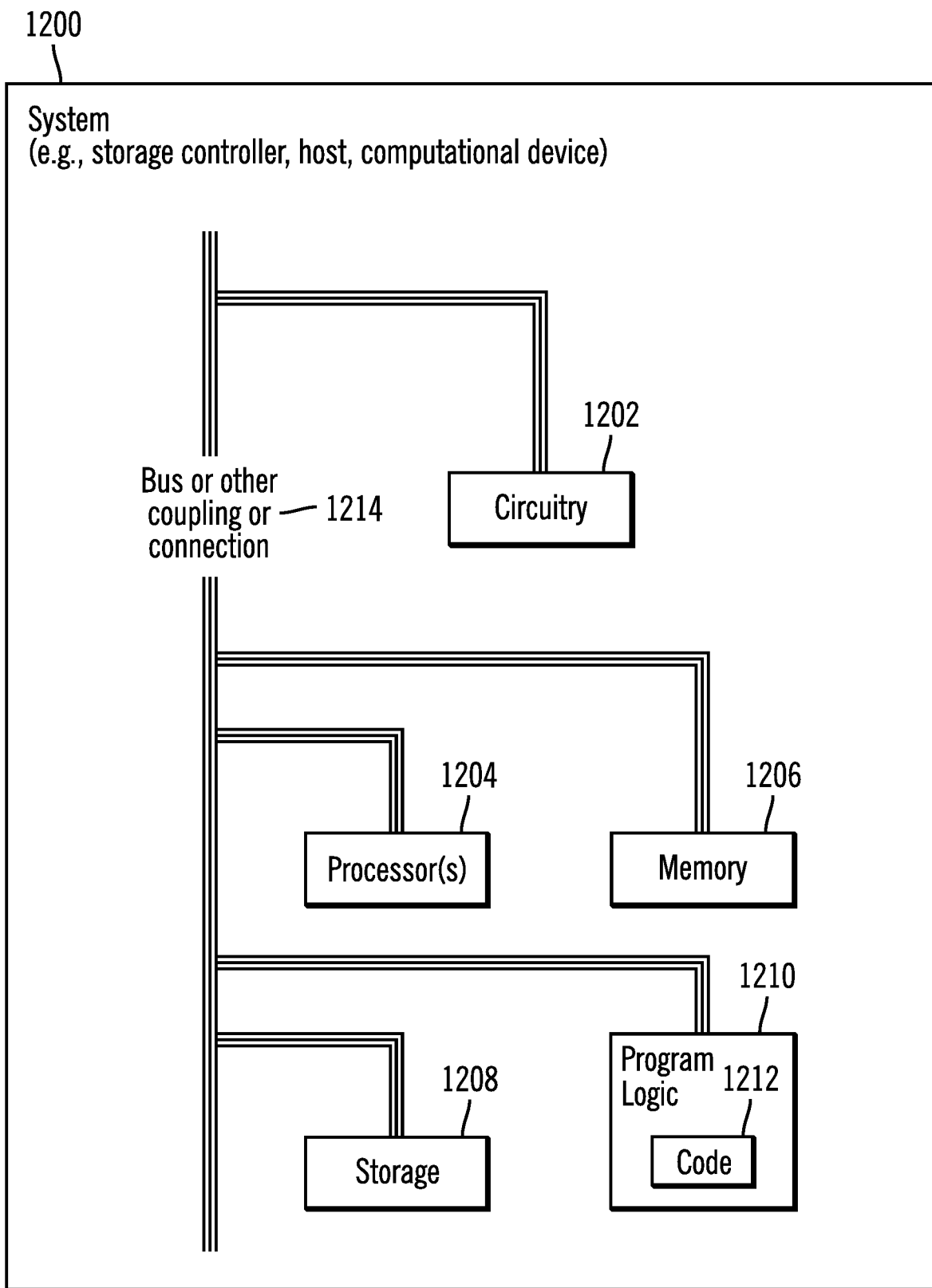
FIG. 12 illustrates a block diagram of a computational system that shows certain elements that may be included in the storage controller or the host, as described in FIGS. 1-11, in accordance with certain embodiments.

FIG. 12 illustrates a block diagram that shows certain elements that may be included in the storage controller 102 or the host 104, or other computational devices in accordance with certain embodiments. The system 1200 may include a circuitry 1202 that may in certain embodiments include at least a processor 1204. The system 1200 may also include a memory 1206 (e.g., a volatile memory device), and storage 1208. The storage 1208 may include a non-volatile memory device (e.g., EEPROM, ROM, PROM, flash, firmware, programmable logic, etc.), magnetic disk drive, optical disk drive, tape drive, etc. The storage 1208 may comprise an internal storage device, an attached storage device and/or a network accessible storage device. The system 1200 may include a program logic 1210 including code 1212 that may be loaded into the memory 1206 and executed by the processor 1204 or circuitry 1202. In certain embodiments, the program logic 1210 including code 1212 may be stored in the storage 1208. In certain other embodiments, the program logic 1210 may be implemented in the circuitry 1202. One or more of the components in the system 1200 may communicate via a bus or via other coupling or connection 1214. Therefore, while FIG. 12 shows the program logic 1210 separately from the other elements, the program logic 1210 may be implemented in the memory 1206 and/or the circuitry 1202.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
maintaining, by a cache management application, a cache for a storage controller and a list corresponding to tracks in the cache, wherein the cache management application places tracks in the list by measuring frequency of usage of tracks in a first time period;
maintaining, by a storage tier management application, a plurality of storage tiers controlled by the storage controller, wherein the storage tier management application collects usage statistics of tracks over a second time period;
maintaining, by the cache management application, in the list, a plurality of partitions, wherein each partition of the plurality of partitions is comprised of a plurality of tracks, and wherein each partition of the plurality of partitions represents a heat index range;
adding, by the cache management application, a new track to the list by:
determining a heat index of the new track as indicated by the storage tier management application; and including the new track in a partition of the plurality of partitions whose heat index range encompasses the heat index of the new track; and demoting, by the cache management application, a track from the list to discard the track from the cache by:

determining which partition of the plurality of partitions has a heat index range that encompasses lowest heat indexes;

determining whether the determined partition has one or more tracks;

in response to determining that the determined partition has one or more tracks, demoting a least recently used (LRU) track of the determined partition; and in response to determining that the determined partition does not have one or more tracks, determining a new partition of the plurality of partitions that has a heat index range that encompasses next lowest heat indexes for demoting one or more additional tracks from the list.

2. The method of claim 1, wherein the second time period is at least a 100 times greater than the first time period.

3. The method of claim 2, wherein the storage tier management application periodically moves extents of a lower heat index to a storage device having a higher response time and moves extents of higher heat index to a storage device having a lower response time.

4. The method of claim 1, wherein the heat index of the new track is an indication of a frequency of usage of tracks of an extent that includes the new track as determined by the storage tier management application.

5. The method of claim 1, wherein the second time period is greater than the first time period.

6. The method of claim 1, wherein the first time period is at most 10 minutes, and wherein the second time period is at least 1 hour.

7. A system, comprising:

a memory; and a processor coupled to the memory, wherein the processor performs operations, the operations performed by the processor comprising:

maintaining, by a cache management application, a cache and a list corresponding to tracks in the cache, wherein the cache management application places tracks in the list by measuring frequency of usage of tracks in a first time period;

maintaining, by a storage tier management application, a plurality of storage tiers, wherein the storage tier management application collects usage statistics of tracks over a second time period;

maintaining, by the cache management application, in the list, a plurality of partitions, wherein each partition of the plurality of partitions is comprised of a plurality of tracks, and wherein each partition of the plurality of partitions represents a heat index range;

adding, by the cache management application, a new track to the list by:

determining a heat index of the new track as indicated by the storage tier management application; and including the new track in a partition of the plurality of partitions whose heat index range encompasses the heat index of the new track; and demoting, by the cache management application, a track from the list to discard the track from the cache by:

determining which partition of the plurality of partitions has a heat index range that encompasses lowest heat indexes;

determining whether the determined partition has one or more tracks;

in response to determining that the determined partition has one or more tracks, demoting a least recently used (LRU) track of the determined partition; and in response to determining that the determined partition does not have one or more tracks, determining a new partition of the plurality of partitions that has a heat index range that encompasses next lowest heat indexes for demoting one or more additional tracks from the list.

8. The system of claim 7, wherein, wherein the second time period is at least a 100 times greater than the first time period.

9. The system of claim 8, wherein the storage tier management application periodically moves extents of a lower heat index to a storage device having a higher response time and moves extents of higher heat index to a storage device having a lower response time.

10. The system of claim 7, wherein the heat index of the new track is an indication of a frequency of usage of tracks of an extent that includes the new track as determined by the storage tier management application.

11. The system of claim 7, wherein the second time period is greater than the first time period.

12. The system of claim 7, wherein the first time period is at most 10 minutes, and wherein the second time period is at least 1 hour.

13. A computer program product, the computer program product comprising a non-transitory computer readable storage medium having computer readable program code embodied therewith, the computer readable program code configured to perform operations, the operations comprising:

maintaining, by a cache management application, a cache for a storage controller and a list corresponding to tracks in the cache, wherein the cache management application places tracks in the list by measuring frequency of usage of tracks in a first time period;

maintaining, by a storage tier management application, a plurality of storage tiers controlled by the storage controller, wherein the storage tier management application collects usage statistics of tracks over a second time period;

maintaining, by the cache management application, in the list, a plurality of partitions, wherein each partition of the plurality of partitions is comprised of a plurality of tracks, and wherein each partition of the plurality of partitions represents a heat index range;

adding, by the cache management application, a new track to the list by:

determining a heat index of the new track as indicated by the storage tier management application; and including the new track in a partition of the plurality of partitions whose heat index range encompasses the heat index of the new track; and demoting, by the cache management application, a track from the list to discard the track from the cache by:

determining which partition of the plurality of partitions has a heat index range that encompasses lowest heat indexes;

determining whether the determined partition has one or more tracks;

in response to determining that the determined partition has one or more tracks, demoting a least recently used (LRU) track of the determined partition; and in response to determining that the determined partition does not have one or more tracks, determining a new partition of the plurality of partitions that has a heat index range that encompasses next lowest heat indexes for demoting one or more additional tracks from the list.

14. The computer program product of claim 13, wherein the second time period is at least a 100 times greater than the first time period.

15. The computer program product of claim 14, wherein the storage tier management application periodically moves extents of a lower heat index to a storage device having a higher response time and moves extents of higher heat index to a storage device having a lower response time.

16. The computer program product of claim 13, wherein the heat index of the new track is an indication of a frequency of usage of tracks of an extent that includes the new track as determined by the storage tier management application.

17. The computer program product of claim 13, wherein the second time period is greater than the first time period.

18. The computer program product of claim 13, wherein the first time period is at most 10 minutes, and wherein the second time period is at least 1 hour.

* * * * *